United States Patent
Chiu et al.

(10) Patent No.: US 11,880,423 B2
(45) Date of Patent: Jan. 23, 2024

(54) MACHINE LEARNED CURATING OF VIDEOS FOR SELECTION AND DISPLAY

(71) Applicant: Loop Now Technologies, Inc., Redwood City, CA (US)

(72) Inventors: Edwin Chiu, Cupertino, CA (US); Stefan Backor, Zilina (SK); Shi Feng, Union City, CA (US); Wu-Hsi Li, Somerville, MA (US); Fuhong Liu, Milpitas, CA (US); Jerry Ting Kwan Luk, Menlo Park, CA (US); Vincent Yang, Redwood City, CA (US)

(73) Assignee: Loop Now Technologies, Inc., San Mateo, CA (US)

( * ) Notice: Subject to any disclaimer, the term of this patent is extended or adjusted under 35 U.S.C. 154(b) by 96 days.

(21) Appl. No.: 17/167,127

(22) Filed: Feb. 4, 2021

(65) Prior Publication Data

US 2021/0240794 A1    Aug. 5, 2021

Related U.S. Application Data

(60) Provisional application No. 63/086,077, filed on Oct. 1, 2020, provisional application No. 62/970,364, filed on Feb. 5, 2020.

(51) Int. Cl.
*G06F 16/957* (2019.01)
*G06F 16/738* (2019.01)
(Continued)

(52) U.S. Cl.
CPC ........ *G06F 16/9577* (2019.01); *G06F 16/735* (2019.01); *G06F 16/739* (2019.01);
(Continued)

(58) Field of Classification Search
CPC .. G06F 16/9577; G06F 16/735; G06F 16/783; G06F 16/90332
See application file for complete search history.

(56) References Cited

U.S. PATENT DOCUMENTS 3,069,414 A1   11/2011   Hartwig et al.
8,244,707 B2   8/2012    Lin et al.
(Continued)

FOREIGN PATENT DOCUMENTS

KR       101606860 B1     3/2016

OTHER PUBLICATIONS

Hochreiter, Sepp, and Jürgen Schmidhuber. "Long short-term memory." Neural computation 9.8 (1997): 1735-1780.

*Primary Examiner* — William Spieler
(74) *Attorney, Agent, or Firm* — Adams Intellex, PLC

(57) ABSTRACT

Techniques for video manipulation based on machine learned video curating are disclosed. Web page content is loaded, where the content includes a frame for short-form videos. The content of the web page is analyzed for textual information. A short-form video server is accessed. Short-form videos are selected from the short-form video server, where the selecting includes automatically curating the short-form videos. Adaptive learning is used for the selecting, based on a user's web page behavior. The adaptive learning includes collecting the user's web page behavior before the selecting. Automatic curating includes selecting, by a neural network, a subset of short-form videos appropriate for the web page. The web page frame is populated with the short-form videos obtained from the video server. Representations of the short-form videos are displayed within the frame on the web page. The short-form videos are auto played within the frame.

27 Claims, 8 Drawing Sheets

(51) Int. Cl.
*G06F 16/958* (2019.01)
*G06F 16/783* (2019.01)
*G06N 20/00* (2019.01)
*G06F 16/9032* (2019.01)
*G06N 3/08* (2023.01)
*G06F 16/735* (2019.01)

(52) U.S. Cl.
CPC ........ *G06F 16/783* (2019.01); *G06F 16/7834* (2019.01); *G06F 16/7844* (2019.01); *G06F 16/90332* (2019.01); *G06F 16/972* (2019.01); *G06N 3/08* (2013.01); *G06N 20/00* (2019.01)

(56) References Cited

U.S. PATENT DOCUMENTS

| | | | |
|---|---|---|---|
| 8,572,490 | B2 | 10/2013 | Hartwig et al. |
| 9,118,712 | B2 | 8/2015 | McCoy et al. |
| 9,532,116 | B2 | 12/2016 | Terpe |
| 9,824,372 | B1 | 11/2017 | Seth et al. |
| 10,089,402 | B1 | 10/2018 | Winkler et al. |
| 2009/0282433 | A1* | 11/2009 | Petta .................. H04N 21/8586 725/32 |
| 2010/0149359 | A1 | 6/2010 | Taoka |
| 2013/0021373 | A1 | 1/2013 | Vaught et al. |
| 2013/0145267 | A1 | 6/2013 | Ramachandran |
| 2013/0246141 | A1 | 9/2013 | Liberty |
| 2013/0276021 | A1 | 10/2013 | Cho |
| 2014/0376876 | A1* | 12/2014 | Bentley .................. G06V 40/23 386/227 |
| 2015/0195175 | A1 | 7/2015 | Kariman |
| 2015/0213516 | A1 | 7/2015 | Jeremias |
| 2015/0278348 | A1* | 10/2015 | Paruchuri ........... G06F 16/9535 707/771 |
| 2016/0065929 | A1 | 3/2016 | Barcons-Palau et al. |
| 2016/0088369 | A1 | 3/2016 | Terpe |
| 2016/0093105 | A1 | 3/2016 | Rimon et al. |
| 2017/0109584 | A1* | 4/2017 | Yao .................... H04N 21/4666 |
| 2017/0339093 | A1 | 11/2017 | Pesavento et al. |
| 2018/0039406 | A1 | 2/2018 | Kong et al. |
| 2018/0068019 | A1 | 3/2018 | Novikoff et al. |
| 2018/0089322 | A1 | 3/2018 | DeLuca |
| 2018/0132011 | A1* | 5/2018 | Shichman ............ H04N 21/233 |
| 2018/0253765 | A1 | 9/2018 | Avedissian et al. |
| 2018/0288396 | A1 | 10/2018 | Bouazizi et al. |
| 2019/0286676 | A1 | 9/2019 | Fatzinger |
| 2020/0364370 | A1* | 11/2020 | Krafcik .................... G06N 20/00 |
| 2021/0089576 | A1* | 3/2021 | Tagra ..................... G06F 16/56 |
| 2021/0166104 | A1* | 6/2021 | Hassan ................. G06N 20/00 |

* cited by examiner

MACHINE LEARNED CURATING OF VIDEOS FOR SELECTION AND DISPLAY

RELATED APPLICATIONS

This application claims the benefit of U.S. provisional patent applications "Machine Learned Curating of Videos for Selection and Display" Ser. No. 62/970,364, filed Feb. 5, 2020, and "Machine Learned Video Template Usage" Ser. No. 63/086,077, filed Oct. 1, 2020.

Each of the foregoing applications is hereby incorporated by reference in its entirety.

FIELD OF ART

This application relates generally to video manipulation and more particularly to machine learned curating of videos for selection and display.

BACKGROUND

One very popular digital pastime is "web surfing", where web surfing has come to refer generally to spending productive, leisure, and procrastination time on the Internet. In fact, people love web surfing. While the web surfing can include meaningful activities such as research, education, or work, more often than not, the web surfing is undertaken for shopping, entertainment, gaming, looking for adorable videos of children or pets, or just killing time. People use a wide range of electronic devices for web surfing in order to engage with the plethora of online information and content found at various websites. To get to a particular website, a person starts a web browser on her or his electronic device and navigates to the website by typing in a web address or uniform resource locator (URL). The URL refers to a specific digital address, essentially the digital equivalent of a physical address. The URL takes the person to a home or landing page. The website homepage presents a variety of content that includes news, sports, politics, adorable puppy videos, kittens doing whacky things videos, products or services for sale, and much, much more. The person can click on stories, sports scores, conspiracy theories, or whatever content is of interest to her or him. From a user perspective, finding an interesting website typically starts either by navigating to a familiar site or with a web search. Whichever technique is used, the user has to have a destination or topic in mind to begin their web surfing experience.

Alternately described as "The Wild West", or a library with its entire collection strewn across the floor, the web poses significant search challenges when it comes to finding particular content. In order to assist in the locating of desired content from among the several billions of websites online, search engines have been developed. One enters a search string such as, "cute puppy videos", or "small form factor computer" into the search engine and initiates the search. However, such general search strings yield vast numbers of hits—nearly 300 billion for cute puppies alone. An ineffective search yields far too many results to be useful or meaningful to the person initiating the search. While writing a concise search string would suggest a solution to this problem, too concise a search can eliminate "near matches", which might actually be closer to what the person seeks. From a provider perspective, such as that of an online retailer, success or failure of their business relies on presenting goods and services to prospective customers and then converting the prospective customers to buyers. The "right" web page needs to be presented quickly to the potential customer looking for a good or service. If such a presentation is not made, the customer will go elsewhere or will simply give up due to loss of interest or lack of time.

Web page creators create their web pages using search engine optimization (SEO) techniques that increase the rankings of their web pages and improve the chances that their web pages will be presented first to users searching the web. Search engine providers examine the web pages that use the SEO techniques to rank the web pages in the search results. These ranked search results are presented to the user in the hopes of directing that user to the web page where she or he will make a purchase. SEO is a bit like a game of cat and mouse. The creators try to create web pages that will be more highly ranked, while the search engine developers try to determine whether the higher rankings are legitimate or gamed. Clearly deceptive and underhanded techniques, such as automating access to a specific page to increase its hit rate and thus its apparent popularity are strongly discouraged. However, legitimate approaches to search engine optimization are encouraged. This latter category includes guides for creating web pages such as embedding meta-titles, descriptors, and keywords within the web page code; structuring URLs so that they can be easily followed by a search engine; and tagging images with appropriate keywords; among other actions. When done properly, web pages created using SEO techniques successfully rise in web page rankings and attract users to the web pages.

SUMMARY

Electronic devices such as desktop computers, laptop computers, tablets, smartphones, and PDAs, are widely used by people who want to observe and interact with web content. The web content, which is often rendered within web browsers as web pages, presents news, government information, entertainment, educational material, and so on. The web content typically includes text, videos including live-feed video, audio, and the like. An individual interacting with the web page may choose to learn more about a news story, a sports team, a product or service, etc. Seeking further information can include conducting a web search, which can result in hundreds, thousands, or more search hits. The individual must then decide whether to try out some of the search results, conduct further searches, etc. If the search involves seeking the latest gossip on a celebrity or tracking a breaking news story, the number and relevance of the top search results can be small and quite manageable, allowing the user to choose her or his preferred information source. By contrast, if the search is for a product or service, and the individual is bombarded with too many results of low relevance, then the individual is highly unlikely to "convert" or buy the good or service. To control the number and the quality of the search results, curating the search results and selecting a few results which are highly relevant to the individual's information quest can be far more effective. The individual is quickly presented with a reasonable number of relevant choices, can safely select the top result, choose their favorite source, and so on. Further, the quality and efficiency of the curating the selection and display of the search results can be significantly improved by applying artificial intelligence (AI) techniques such as adaptive learning. By observing the individual as she or he behaves while interacting with a web page, the selection of the top search results can be greatly enhanced, thus refining the relevance of results, improving the individual's user experience (UX), and increasing the probability of the individual "converting" from a viewer to a purchaser or consumer.

Video manipulation is based on machine learned curating of videos for selection and display. A processor-implemented method for video manipulation is disclosed comprising: loading content of a web page, wherein the content includes a frame for a plurality of short-form videos; analyzing the content of the web page for textual information; accessing a short-form video server; selecting a plurality of short-form videos from the short-form video server based on the textual information, wherein the selecting includes automatically curating the plurality of short-form videos; populating the frame on the web page with the plurality of short-form videos obtained from the short-form video server; and displaying representations of the plurality of short-form videos within the frame on the web page. The automatic curating can include using a neural network, such as a recurrent neural network, to select a subset of the plurality of short-form videos that are appropriate for the web page. The neural network can implement a model such as a long short-term memory model, where the long short-term memory model uses feedback within the neural network to process sequences of data. The sequences of data can include speech or videos. The automatic curating can be based on machine learning such as deep learning. The machine learning can include training the neural network for the automatic curating by applying training data to the neural network. The short-form videos can be auto played within the frame on the web page. A response to a call to action embedded within the frame on the web page can be received. A second plurality of short-form videos, based on the response to the call to action from the short-form video server, can be provided. The criteria for the second plurality of short-form videos can modify the automatic curating of the plurality of short-form videos.

The automatic curating can be enhanced or updated using adaptive learning. Adaptive learning is a technique that can include collecting information associated with an individual, analyzing that information, and using the analysis results to update various parameters or interconnections associated with the neural network. The updating parameters associated with the neural network can include updating weights, biases, coefficients, etc., associated with the neural network. The collected information that can be associated with the adaptive learning can include the individual's web page behavior, swipes and/or clicks on a web page, comparison with other individuals' web page behavior, and the like. Contextual information from a web page and demographic data associated with the individual can also be used for adaptive learning. The quality of the improvements made to the neural network increases as more data is collected and analyzed. The individual can choose to "opt in" to enable collection of further information associated with usage or website behavior of the user on a given website, behavior on additional websites, and so on.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Figure 1A:
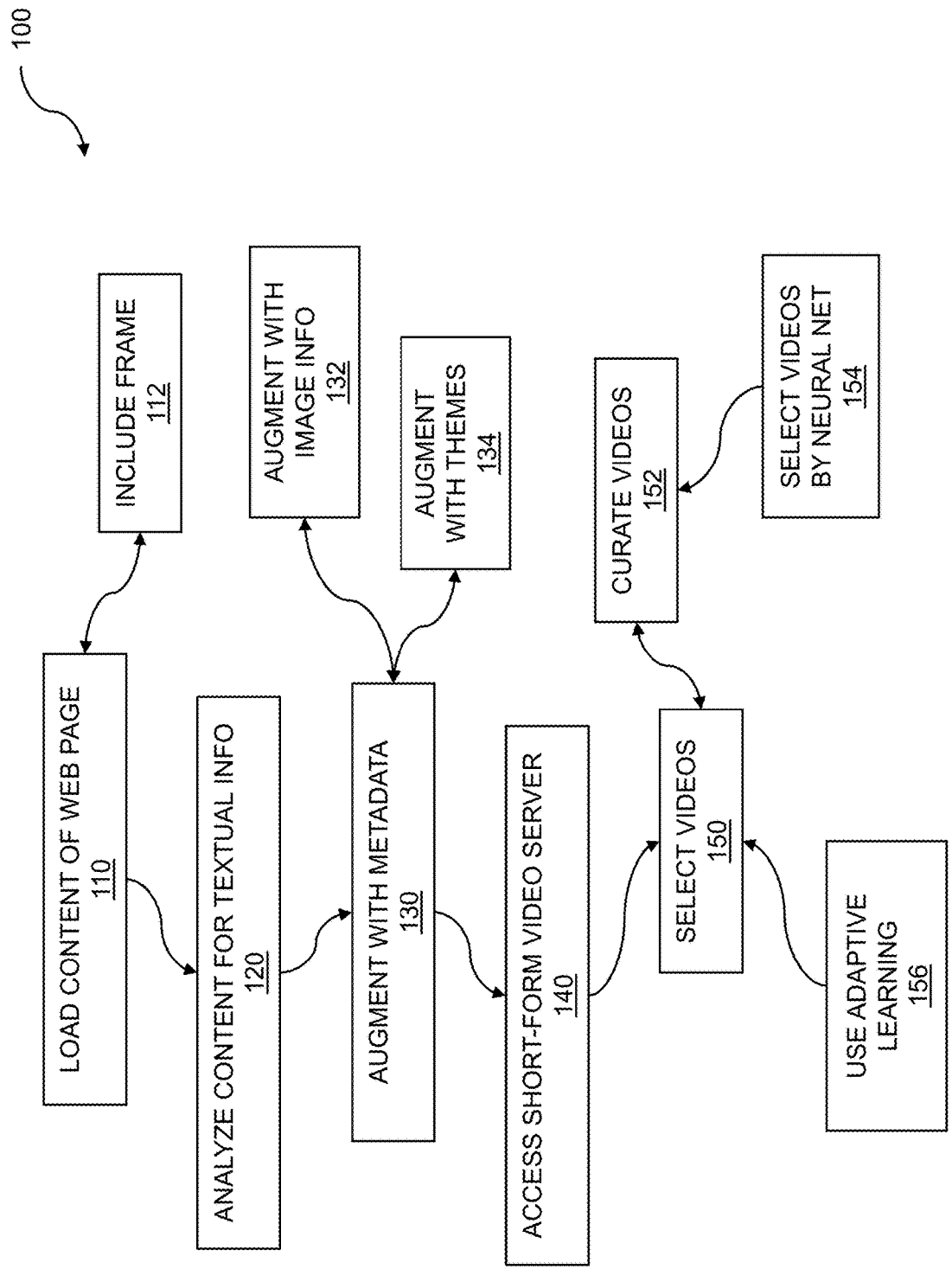
FIG. 1A is a flow diagram for machine learned curating of videos.

Techniques are disclosed for video manipulation based on machine learned curating of videos for selection and display. Web pages can be loaded by an individual using an electronic device such as a desktop computer, a laptop computer, a tablet, a smartphone, a personal digital assistant (PDA), and so on. The web pages that can be loaded can include text, images, videos, audio, and other content that present a message, a feeling or visceral reaction, a theme, an experience, and so on, related to or associated with the web pages. While the information on a given web page may be useful, access to similar or related web pages is widely known to greatly enhance the user experience as the individual consumes the web page content. For example, if an individual is consuming news reports and wishes to learn more about a particular topic, a simple search can easily yield hundreds or thousands of search results or hits. The myriad results can include similar key words, topics, names, and so on, but the usefulness or merit of the vast proportion of the results can be questionable. A "smart search" can reduce the number of search results, but knowing how to do such an enhanced search can be time consuming and confusing. Curated selection of the search results greatly enhances the experience of the individual with their selected web page.

Machine learned curating of videos for selection and display enables video manipulation. Content of a web page is loaded, where the content includes a frame for a plurality of short-form videos. The content of the web page is analyzed for textual information. The content of the web page can be further analyzed for video information, audio information, and so on. A short-form video server is accessed, where the short-form video server is decentralized from storage and content for the remainder of the web page. A plurality of short-form videos is selected from the short-form video server based on the textual information, where the selecting includes automatically curating the plurality of short-form videos. The automatic curating includes using a neural network to pick a subset of the plurality of short-form videos that are appropriate for the web page. The frame on the web page is populated with the plurality of short-form videos obtained from the short-form video server. The frame can include a horizontally scrollable frame, a grid, and so on. Representations of the plurality of short-form videos are displayed within the frame on the web page. The plurality of short-form videos is played within the frame. A response to a call to action embedded within the frame on the web page is received. A second plurality of short-form videos is provided, based on the response to the call to action from the short-form video server, where criteria for the second plurality of short-form videos modifies the automatic curating of the plurality of short-form videos. As a user's web page behavior is observed, adaptive learning can be used for selecting short-form videos. The adaptative learning enables machine learned curating of videos for selection and display. The adaptive learning can be based on a user's web page behavior. The adaptive learning can include collecting the user's web page behavior before the selecting occurs, that is, prior web page behavior. The adaptive learning can include collecting the user's swipes and/or clicks on the web page or on web pages related to the web page.

FIG. 1A is a flow diagram for machine learned curating of videos. Videos, which can include short-form videos, can include various media types such as news videos, entertainment videos, political message videos, and so on. A short-form video can include a video with a duration of a few seconds, a minute, etc. The videos can be viewed on an electronic device used by an individual. The videos can be included among additional contents of a web page, where the additional contents can include text and audio. The web page can include a frame. The short-form videos can be stored on a video server, where the video server is decentralized from the remainder of the web page content. Short-form videos can be selected from the server and used to populate the frame on the web page being viewed by the individual. The frame that is populated by the short-form videos can include a horizontal orientation, a vertical orientation, a grid, and the like. The frame can be scrollable in the horizontal orientation, in the vertical orientation, and in the grid configuration. The short-form videos within the frame can be auto played.

The flow 100 includes loading content of a web page 110. The loading of the web page content can be accomplished using a web browser. The web page can include a web page selected by an individual. The web page can include content from a variety of websites such as a news website, an e-commerce website, a government website, and so on. The web page content can include text, images, video, audio, and the like. The text can include fonts, characters, emojis, etc. The video and audio can be based on a variety of standards or protocols such as MPEG-4™, Flash™, QuickTime™, etc. for video, and MPEG-3™, WAV™, AIFF™ etc. for audio. The content of the web page that is loaded can be based on the electronic device used by the individual to view the contents of the web page. The individual can load the web page content using a desktop computer, a laptop computer, a tablet, a smartphone, a PDA, or other electronic device. The web page content that is loaded can be determined based on display size, display resolution, download settings configured by the individual, etc. In the flow 100, the content includes a frame 112 for a plurality of short-form videos. Discussed throughout, the frame can be scrollable and can be included in a horizontal orientation, a vertical orientation, or a grid orientation. In embodiments, the frame can be added to an existing web page to facilitate display of relevant short-form videos, as discussed below. The frame can be positioned within the web page, can include a floating box over the web page, etc. In further embodiments, the frame on the web page can pull a plurality of short-form videos from a short-form video server. The short-form videos can be displayed within the frame on the web page.

The flow 100 includes analyzing the content of the web page for textual information 120. The analyzing the textual information can include processing the text for one or more keywords, one or more key phrases, and so on. Textual data can include the actual words on a web page that a user sees. Textual data can be a purer representation of web page content than SEO metadata and the like. The analyzing can further include analysis of video information. The video information can include keywords associated with the video; objects, people, or animals within the video; and the like. The analyzing can also include an analysis of audio information. The analyzing audio information can include natural language processing. The flow 100 further includes augmenting the textual information with metadata 130. Metadata, or "data about data", can provide information in addition to the results of the analysis. The metadata can include a timestamp, web journey information (e.g., page visits, buttons clicked), user information, SEO data, cookies, etc. Discussed below, the augmenting the textual information with metadata can be used for selecting a plurality of short-form videos based on the metadata. The augmenting with metadata can also be applied to video information and audio information. The flow 100 further includes augmenting the textual information with image information 132 and selecting the plurality of short-form videos based on the image information. The augmenting textual information with image information can include an image description, keyword, or phrase; a description of image contents; etc. The flow 100 further includes augmenting the textual information with themes 134 extracted from the web page, wherein the selecting of themes is based on ranking associations of metadata with short-form video theme information. A web page theme can include a look, a style, a mood, or "feeling" communicated by a web page. The theme can include happy or sad, scary or motivational, calling to take an action, entertaining or annoying, etc. The flow 100 includes accessing a short-form video server 140. A short-form video can include a video the duration of which includes a few seconds such as 15 seconds, a minute, and so on. The short-form video can include a video used for marketing, commercial, news, governmental, educational, or other purposes. The video server can include a local server, a remote server, a cloud-based server, a grid server, etc. The video server can include a server that is decentralized from other compute and storage capabilities that are involved in the web page content and rendering.

The flow 100 includes selecting a plurality of short-form videos 150 from the short-form video server based on the textual information. The plurality of short-form videos can include two or more videos, where the two or more videos can include substantially similar content. The short form can provide a range of content that might by generally related, where the general relation can include "news", "entertainment", "travel", and the like. In a usage example, the selection of short-form videos could include travel videos of destinations as diverse as scuba diving in the Caribbean, trekking in the Himalayas, or bungee jumping in Australia. In the flow 100, the selecting includes automatically curating 152 the plurality of short-form videos. The curating selection of the short-form videos can be based on user preferences, a marketing message, and so on. In further embodiments, the automatic curating can be based on a long short-term memory model which tracks recent behavior by a user accessing the web page. The recent behavior by the user can include web pages visited, menu selections made, buttons clicked, etc. In embodiments, the curating can use temporally weighted behaviors by a user accessing the web page. The temporally weighted behaviors can include an amount of time spent by the user on a given web page, an amount of time between actions such as button clicks or scrolling, and the like.

In the flow 100, the automatic curating includes selecting, by a neural network 154, a subset of the plurality of short-form videos that are appropriate for the web page. The neural network can include a convolutional neural network. In embodiments, the neural network can be based on a long short-term memory model, where the long short-term memory model can be executed on a recurrent neural network. Other neural network models and configurations can be used. In embodiments, the automatic curating can include machine learning. The machine learning can be accomplished on a neural network such as a deep learning neural network. The machine learning can be accomplished using supervised, unsupervised, or semi-supervised techniques for training the neural network. The training the neural network can include using known-good data for which expected results have be determined by calculation, estimation, human experts, etc. In other embodiments, the automatic curating provides the subset of videos based on contextual information from the web page. The contextual information can include keywords, hidden text, tags, and the like, associated with the web page. The contextual information can include web page information such as whether the web page is a home page, a product page, a news story page, etc. In other embodiments, the contextual information can be based on video information from the web page. The video information can include type of video, video contents, and the like.

The flow 100 includes using adaptive learning 156. The adaptive learning can be based on a user's web page behavior. Discussed throughout, short-form videos can be selected based on criteria such as textual information. The selecting can further include automatic curation of the short-form videos. As a user's web page behavior is observed, adaptive learning can be used for selecting short-form videos. The adaptative learning enables machine learned curating of videos for selection and display. The adaptive learning can be based on a user's web page behavior. The adaptive learning can include collecting the user's web page behavior before the selecting occurs, that is, prior web page behavior. The adaptive learning can include collecting the user's swipes and/or clicks on the web page or on web pages related to the web page. The adaptive learning can include comparing other users' historical patterns of web page behavior with the user's current web page behavior. The adaptive learning can combine the user's web page behavior with contextual information from the web page. The adaptive learning can include demographic data about the user. An "opting-in" by the user can enable the collection of additional web page behavior about the user. The collecting of additional web page behavior can include monitoring the user's web page behavior on additional websites. The user can be rewarded for opting in.

Various steps in the flow 100 may be changed in order, repeated, omitted, or the like without departing from the disclosed concepts. Various embodiments of the flow 100 can be included in a computer program product embodied in a non-transitory computer readable medium that includes code executable by one or more processors.

Figure 1B:
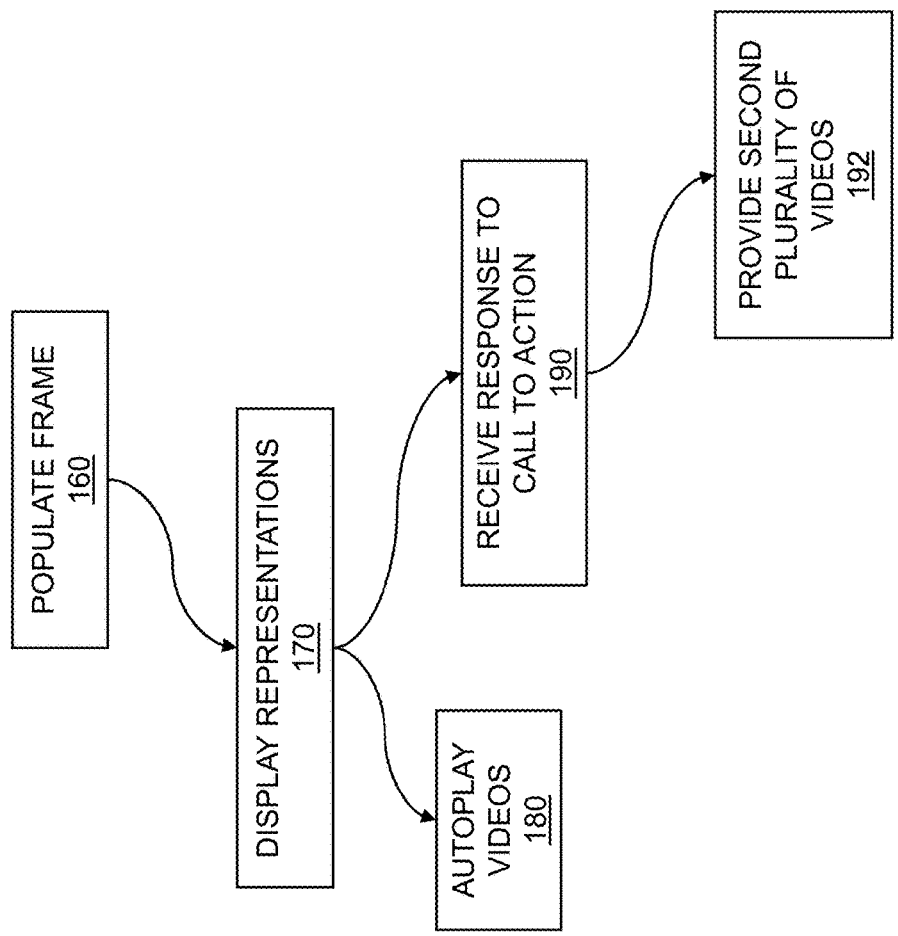
FIG. 1B is a flow diagram for displaying curated videos.

FIG. 1B is a flow diagram for displaying curated videos. The flow 102 includes populating the frame 160 on the web page with the plurality of short-form videos obtained from the short-form video server. The populating can include obtaining the plurality of short-form videos from the server and loading the short-form videos into the frame on the web page. The flow 102 includes displaying representations 170 of the plurality of short-form videos within the frame on the web page. The representations can include reduced size or "thumbnail" versions of the short-form videos. The full-size videos can be viewed by selecting or clicking on the representations of the videos. In embodiments, the frame can show representations of the plurality of short-form videos in a linear fashion. The frame can comprise a horizontal configuration or a vertical configuration. The number of short-form videos that populate the frame may not all be visible at one time. The frame can be scrollable. In other embodiments, the frame can show representations of the plurality of short-form videos in a grid fashion. The grid can also be scrollable.

The flow 102 further includes auto playing the plurality of short-form videos 180 within the frame. The auto playing can occur once the frame is populated. The auto playing the short-form videos can include auto playing videos that are visible within the frame. As scrolling occurs within the frame, the short-form videos that become visible within the frame can be auto played. The auto playing can occur when the individual interacting with the web page moves a cursor over the short-form video representation within the frame. The flow 102 further includes receiving a response to a call to action 190 embedded within the frame on the web page. A call to action can include urging the individual viewing the web page to take some action. The call to action can include signing a petition, making a purchase, signing up for a newsletter, and so on. The response to a call to action can include a button click, data entered into a webform, and the like. The flow 102 further includes providing a second plurality of short-form videos 192, based on the response to the call to action, from the short-form video server. Criteria for the second plurality of short-form videos can be used to modify the automatic curating of the plurality of short-form videos. The second plurality of short-form videos can include a subset of the first plurality of short-form videos, an additional set of short-form videos, a different set of short-form videos, etc.

Various steps in the flow 102 may be changed in order, repeated, omitted, or the like without departing from the disclosed concepts. Various embodiments of the flow 102 can be included in a computer program product embodied in a non-transitory computer readable medium that includes code executable by one or more processors.

Figure 2:
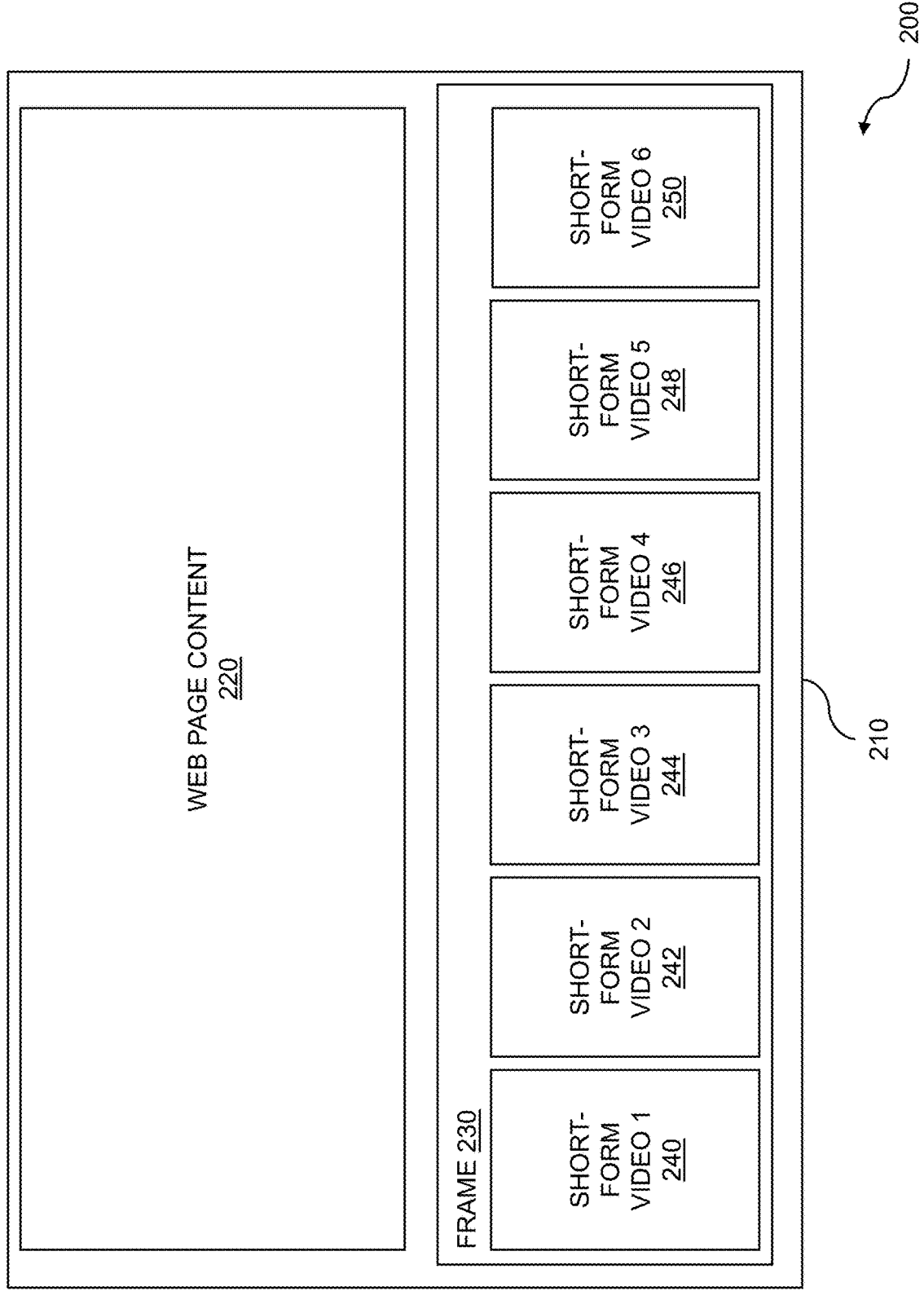
FIG. 2 is an example web page with a frame.

FIG. 2 is an example web page with a frame. A web page that includes a frame can be rendered on a display. The frame can be populated with short-form videos which have been selected based on analysis of textual information analyzed within the web page. The contents of the frame are selected based on machine learned curating of videos for selection and display. Content of a web page is loaded, where the content includes a frame for a plurality of short-form videos. The content of the web page is analyzed for textual information. A short-form video server is accessed. A plurality of short-form videos is selected from the short-form video server based on the textual information, where the selecting includes automatically curating the plurality of short-form videos. The frame on the web page is populated with the plurality of short-form videos obtained from the short-form video server. Representations of the plurality of short-form videos are displayed within the frame on the web page. Embodiments include auto playing the plurality of short-form videos within the frame.

An example web page with a frame is shown 200. The web page and frame can be rendered on a display 210, where the display can include a display associated with a computing device such as a laptop computer or desktop computer; a personal electronic device such as a tablet, smartphone, or PDA; and so on. The web page can include web content 220. The web content can include text, images, video clips, videos, audio, audio clips, and so on. Discussed throughout, the web page content is analyzed for textual information, video information, audio information, etc. A plurality of short-form videos is selected based on analysis of the information gleaned from the web page. The selected short-form videos can be used to populate a frame 230 included in the web page content. The short-form videos can include short-form video 1 240, short-form video 2 242, short-form video 3 244, short-form video 4 246, short-form video 5 248, and short-form video 6 250. While six short-form videos are shown, other numbers of short-form videos can populate the frame on the web page.

Figure 3:
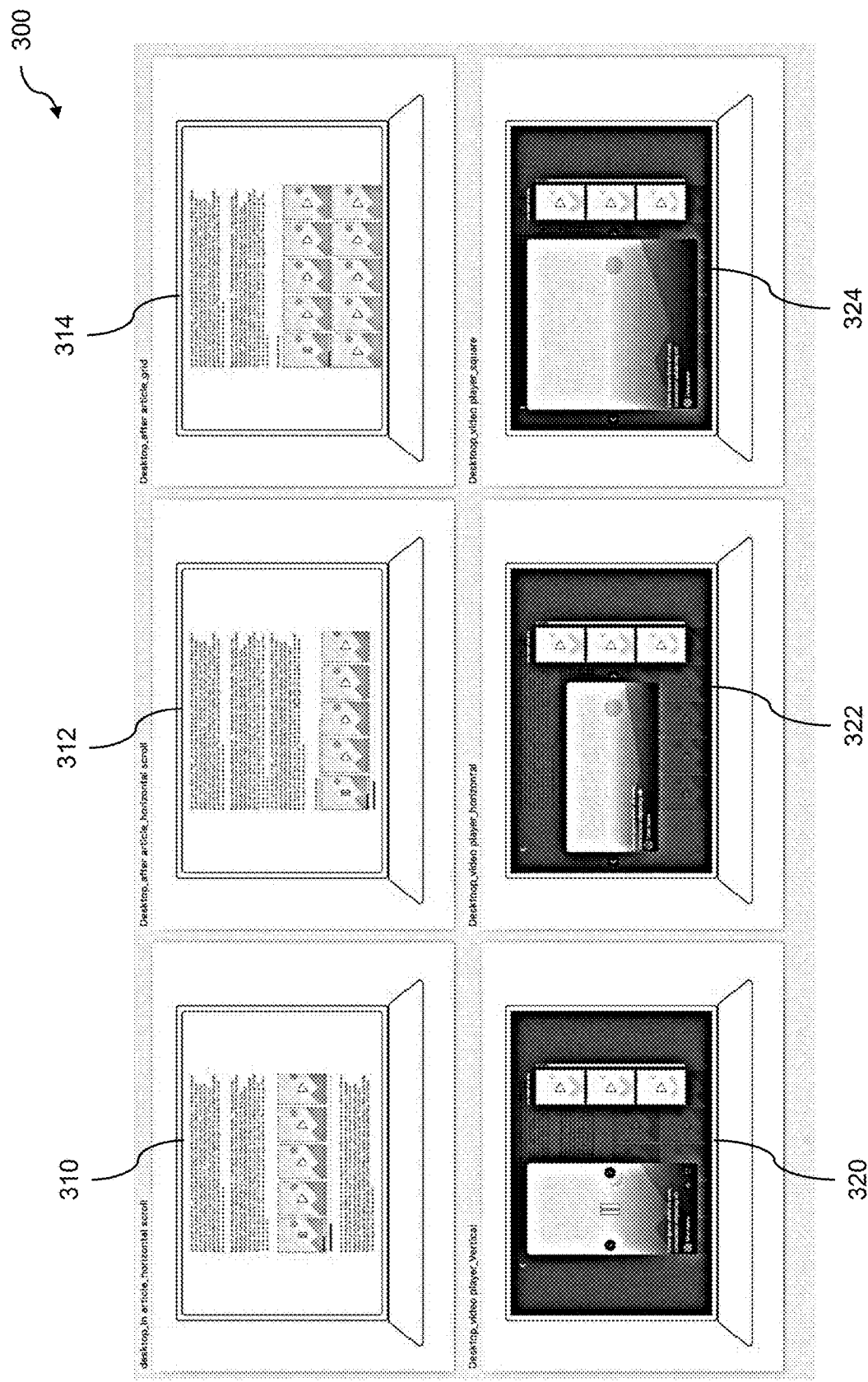
FIG. 3 shows embedded videos on a desktop/laptop device.

FIG. 3 shows embedded videos on a desktop/laptop device 300. A variety of web browsers can be used to display a web page on an electronic device such as a laptop computer, a desktop computer, and so on. The web page that is displayed can include a frame that can be populated with short-form videos selected from a plurality of short-form videos selected from a short-form video server. The short-form videos within the frame can be curated, where the curating is based on machine learning related to videos selection.

Web pages and frames included within the web page can be displayed on a user device such as a laptop computer, a desktop computer, and so on. Given that a web page displayed on a laptop, for example, is rendered with a horizontal orientation, the frame within the web page can also be rendered with a horizontal orientation. Recall that a plurality of short-form videos is selected from a short-form video server, and that the frame within the web page is populated with the selected short-form videos. To access the short-form videos represented within the frame, the user can scroll horizontally 310 within the frame. The horizontal scrolling within the frame can be supported while the user scrolls down the web page. The horizontal scrolling frame remains visible even at the bottom of an article 312 or other web content of a web page. Other configuration techniques can be used for the frame within the web page. In embodiments, a grid 314 can be used for displaying representations of the plurality of short-form videos selected from the short-form video server and used to populate the frame within the web page.

A video player can be used to play a short-form video or other video selected by the user. The video player can include an MPEG-4™ player, a Flash™ player, a Quick-Time™ player, and so on. The video player can be used to play the selected short-form video in various configurations. In embodiments, the configuration in which the video player plays the short-form video can include a vertical 320 or portrait configuration or orientation. The selected short-form video that is selected by the user for play can be zoomed, scaled, cropped, etc., in order to fit within the vertical configuration. In other embodiments, the configuration for playing the short-form video can include a horizontal 322 or landscape configuration. The horizontal configuration can include various aspect ratios including common aspect ratios such as 4:3, 16:9, and so on. In further embodiments, the configuration for playing the short-form video can include a square 324 configuration. The square configuration can be accomplished by zooming, scaling, cropping, etc. the short-form video.

Figure 4:
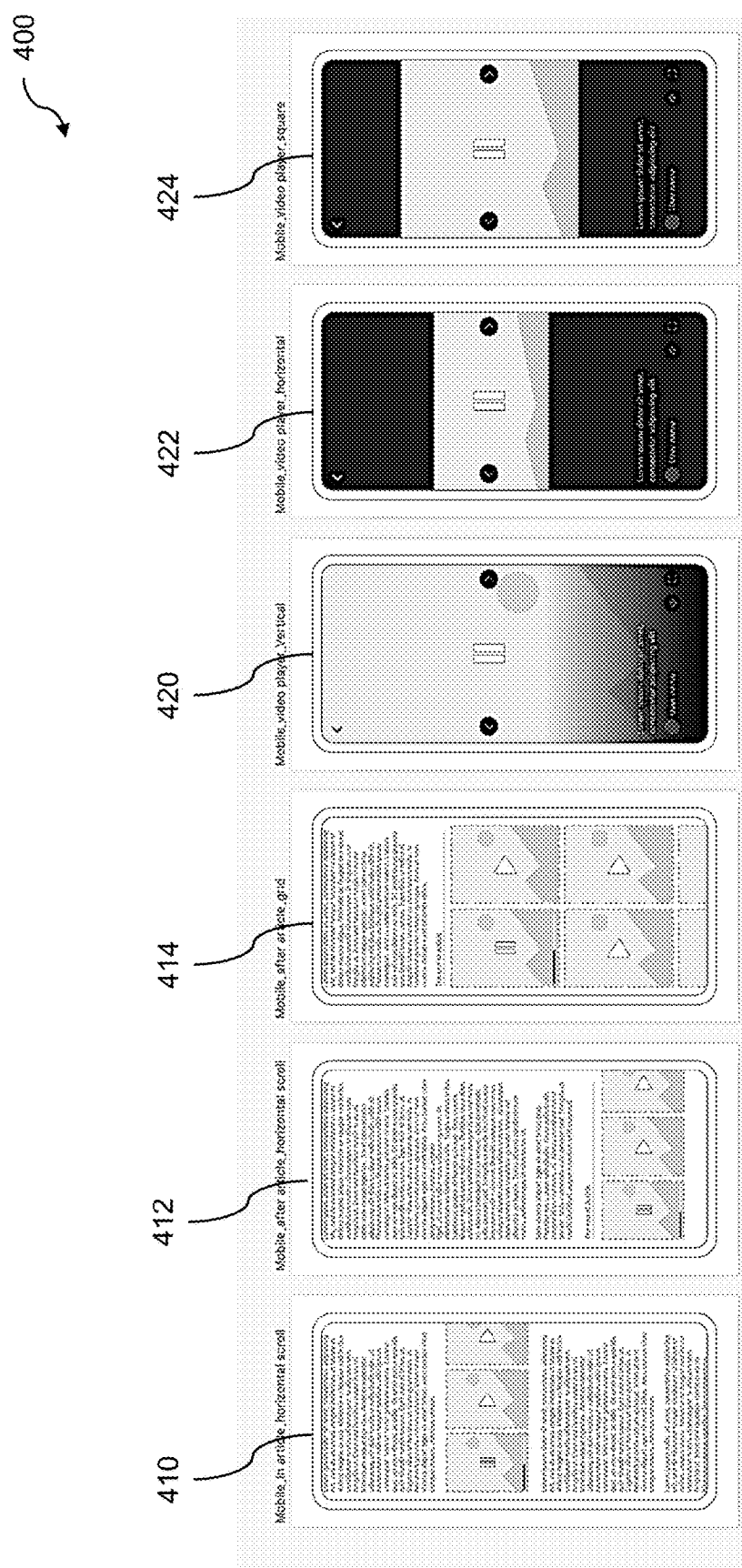
FIG. 4 illustrates embedded videos on a mobile device.

FIG. 4 illustrates embedded videos on a mobile device. A mobile device can be used to access a web page on which a frame comprising representations of selected short-form videos can be displayed. The displaying the short-form videos can be based on machine learned curating of videos for selection and display. Content of a web page is loaded. The content includes a frame for a plurality of short-form videos. The content of the web page is analyzed for textual information. A short-form video server is accessed. A plurality of short-form videos is selected from the short-form video server based on the textual information. The selecting includes automatically curating the plurality of short-form videos. The frame on the web page is populated with the plurality of short-form videos obtained from the short-form video server, and representations of the plurality of short-form videos are displayed within the frame on the web page.

Examples of embedded videos displayed on a mobile device are shown 400. Content of a web page, where the content includes a frame, can include horizontal scrolling 410. The horizontal scrolling can include horizontal scrolling among the videos selected from the short-form video server and displayed within the frame. Horizontal scrolling can include swiping left, swiping right, etc., to find a desired short-form video. The short-form video can then be selected or played by tapping the representation of the short-form video. The frame that enables horizontal scrolling among the representations of the selected videos can persist irrespective of where on the web page the user is interacting with web page content. In 412, the user has scrolled to the end of the web content on the web page. Note that the frame that enables horizontal scrolling among the selected short-form videos is still displayed. Other frame configurations can be included. In embodiments, the frame can display representations of the selected short-form videos in a grid 414. The grid can enable scrolling horizontally and vertically.

A selected short-form video can be viewed by the user by running a video player. The video player can include a video player app that can be installed on the electronic device. The video player can play the selected short-form video in various orientations. The orientations can include orientations coded by a developer of the web page, an orientation of the electronic device, an orientation selected by a user, and so on. In embodiments, the video player can play the short-form video in a vertical orientation 420. The short-form video can be scaled, cropped, etc., to fit the vertical orientation. In other embodiments, the video player can play the short-form video in a horizontal orientation 422. The horizontal orientation can include various display ratios such as 4:3, 16:9, "letter box", etc. As for the vertical orientation, the video player can scale, crop, adjust, and the like, the short-form video for display in the horizontal orientation. In further embodiments, the video play can play the short-form video in a square configuration 424. The short-form video can be scaled and cropped to fit the short-form video into the square configuration. The square configuration can be useful for maximizing the center of a short-form video for ease of viewing the short-form video.

Figure 5:
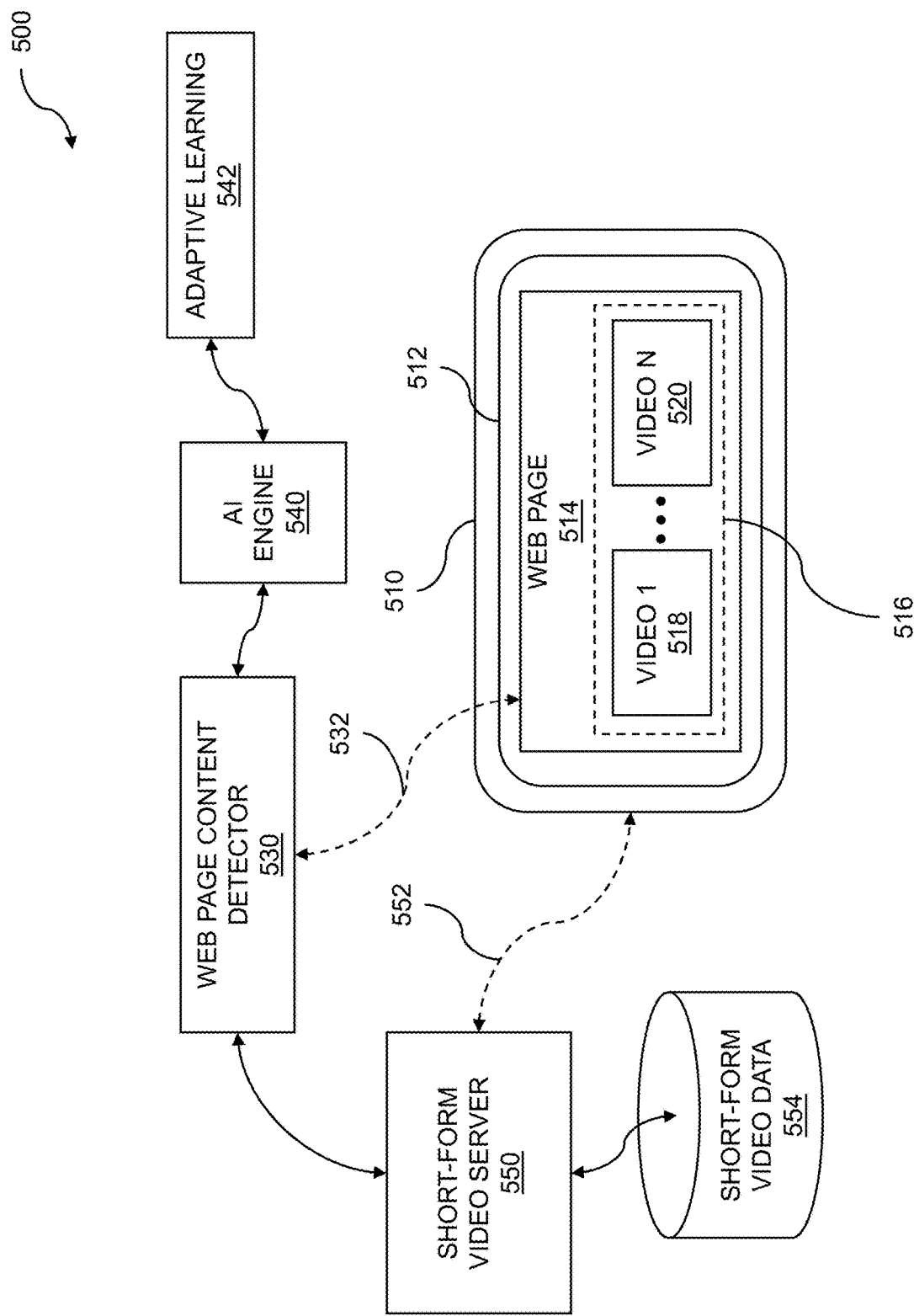
FIG. 5 is a block diagram for a web page communicating with a source.

FIG. 5 is a block diagram for a web page communicating with a source 500. The communication between the web page and the source enables machine learned curating of videos for selection and display. Content of a web page is loaded where the content includes a frame for a plurality of short-form videos. The content of the web page is analyzed for textual information, and a short-form video server is accessed. A plurality of short-form videos is selected from the short-form video server based on the textual information where the selecting includes automatically curating the plurality of short-form videos. The frame on the web page is populated with the plurality of short-form videos obtained from the short-form video server. Representations of the plurality of short-form videos are displayed within the frame on the web page.

Described throughout, short-form videos can be selected from a plurality of short-form videos hosted by a short-form video server. The selecting can be based on a web page visited by a user. The web page can include one of a plurality of web pages that can be viewed by the user. Based on analysis of the web page, short-form videos are selected from the server and displayed on the web page viewed by a user. The user can visit a web page using an electronic device 510. The electronic device can include a desktop or laptop computer, a tablet or smartphone, a personal digital assistant (PDA), and so on. The electronic device is coupled to a display 512 on which a web page 514 can be rendered. A frame 516 on the web page is populated with videos such as video 1 518, video N 520, and so on. While two videos are shown, other numbers of videos can be populated within the frame. The electronic device can be in communication with a web page content detector 530. The communication between the electronic device and the web page content detector can be accomplished using a communication channel such as a wireless communication channel 532. The web page content detector can analyze the web page for textual information. The textual information can be detected by searching for text on the web page. In addition, web page tags, hidden text, and so on can augment the textual information. The textual information can be detected based on natural language analysis of audio data from the web page. The web page content detector can be controlled by an artificial intelligence (AI) engine 540. The AI engine, which can be based on a neural network such as a convolutional neural network or a recurrent neural network, can be used to curate selection or picking of one or more short-form videos. The short-form videos that are selected can be used to populate the frame 516 within the web page 514. The AI engine 540 can include adaptive learning 542. Adaptive learning, described presently, can be embedded in the AI engine 540 or can be implemented in a distributed fashion.

The web page content detector 530 can access a short-form video server 550. The short-form video server can be decentralized from other compute and storage capabilities related to the web page. The short-form video server can be in communication with the electronic device via a communications channel 552, where the communications channel can include a wireless communications channel. The short-form video server can provide a plurality of short-form videos. The short-form videos can be selected from short-form video data storage 554. The short-form video data storage can include decentralized storage. The short-form videos selected by the short-form video server can be used to populate the frame 516 on the electronic device 510. Representations of the short-form videos can be displayed within the frame on the web page, where the displaying can include auto playing the short-form videos.

Figure 6:
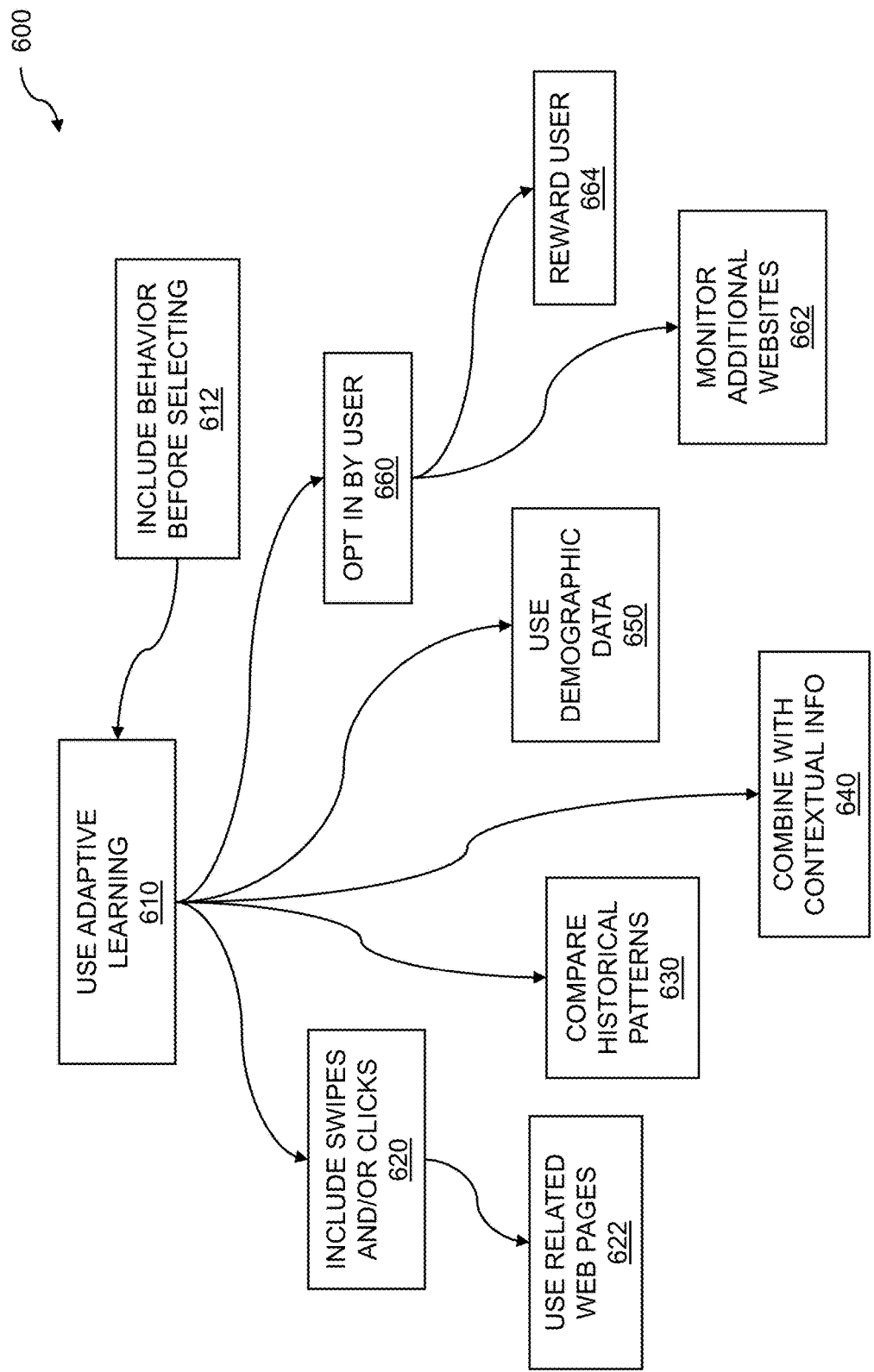
FIG. 6 is a flow diagram for adaptive learning usage.

FIG. 6 is a flow diagram for adaptive learning usage. Discussed throughout, short-form videos can be selected based on criteria such as textual information. The selecting can further include automatic curation of the short-form videos. As a user's web page behavior is observed, adaptive learning can be used for selecting short-form videos. The adaptative learning enables machine learned curating of videos for selection and display. Content of a web page is loaded, where the content includes a frame for a plurality of short-form videos. The content of the web page is analyzed for textual information. A short-form video server is accessed. A plurality of short-form videos is selected from the short-form video server based on the textual information, where the selecting includes automatically curating the plurality of short-form videos. The frame on the web page is populated with the plurality of short-form videos obtained from the short-form video server. Representations of the plurality of short-form videos are displayed within the frame on the web page.

The flow 600 includes using adaptive learning 610 for the selecting. The adaptive learning can be used to adjust the selecting of short-form videos for a user. The adaptive learning can include selections made by the user, websites visited, content viewed, and so on. The adaptive learning can be based on preferences presented by the user, a user identification (ID), and the like. In the flow 600, the adaptive learning includes collecting the user's web page behavior 612 before the selecting. The user's web page behavior can include websites visited, menu items selected, radio buttons clicked, and so on. The website behavior can be used to infer user preferences. In a usage example, website behavior could be used to determine a user's preferences for short-form videos containing dogs over cats; mountain landscapes over desert islands, Baroque string quartets over death metal rages, and so on. The user behavior can be observed for adaptive learning prior to the selecting. The user behavior can be based on past use over an amount of time such as an hour, a day, a week, time since subscribing to a webservice or enabling an app, and the like. The user behavior can be based on content viewed, menu selections chosen, radio buttons pressed, etc., for a single page, for types of web pages such as news pages or entertainment pages, and so on. The user behavior can be based on content or selections across a plurality of web pages.

In the flow 600, the adaptive learning includes collecting the user's swipes and/or clicks 620 on the web page. The one or more swipes executed by the user can include swiping up, down, left, or right; swiping in a clockwise or counterclockwise rotation motion; and so on. The one or more swipes can enable selection or deselection, approval or disapproval, moving through a list such as a list of options, and the like. The one or more clicks can include clicking on an object, a radio button, a menu selection, etc.; using a human digit touching or pressing a touch screen; using a mouse or a trackpad; and the like. In the flow 600, the adaptive learning includes collecting the user's swipes and/or clicks on web pages related 622 to the web page. The web pages that can be related to the web page can include web pages accessible through the web page; web pages that provide similar content such as news sources, shopping sites, or social networks; web pages that provide similar short-form videos such as cute puppy or kitten videos; anime music videos (AMVs); etc.

In the flow 600, the adaptive learning includes comparing 630 other users' historical patterns of web page behavior with the user's web page behavior. The comparison of the user's web page behavior with that of other users' historical patterns can be useful to anticipating sites that the user might want to visit, content such as short-form videos related to the user's purpose for visiting a web page, and the like. The other users may be friends of the user or otherwise associated with the user, a selection of other users etc. In the flow 600, the adaptive learning combines the user's web page behavior with contextual information 640 from the web page. The contextual information can include a portion or region of the web page with which the user is interacting, a time of day, a day of week, etc. The contextual information can enable curation of videos such as short-form videos for selection and display. The contextual information can include current events, popular memes, and the like.

In the flow 600, the adaptive learning includes demographic data 650 about the user. The demographic data can include information associated with the user such as age, gender or gender identity, race, ethnicity, religious affiliation if any, etc. The demographic data can include socio-economic information such as employment status, educational level, income level, marital or domestic partnership status, and the like. The demographic data can further include more general data such as state, region, or country of residence. The demographic data can enable selection of videos based on appropriate curation such as selecting age-appropriate material, culturally-appropriate material, etc. The flow 600 further includes an opting-in by the user 660 to collect additional web page behavior. The opting-in can be accomplished by enrolling, providing user credentials, clicking a button, checking a box, and so on. The opting-in can be used for collecting research data, enhancing the user's experience, etc. In the flow 600, the additional web page behavior includes monitoring 662 the user's web page behavior on additional websites. The additional websites can include websites associated with the website, websites coupled to or accessible to the website, and the like. The additional websites can include websites visited randomly by the user. The flow 600 further includes rewarding the user 664 for opting in. The rewarding of the user can include compensating the user such as providing a discount on a first purchase; paying the user; assigning the user credits that can be used for accessing videos such as short-form videos; crediting a blockchain coupon; and so on.

Figure 7:
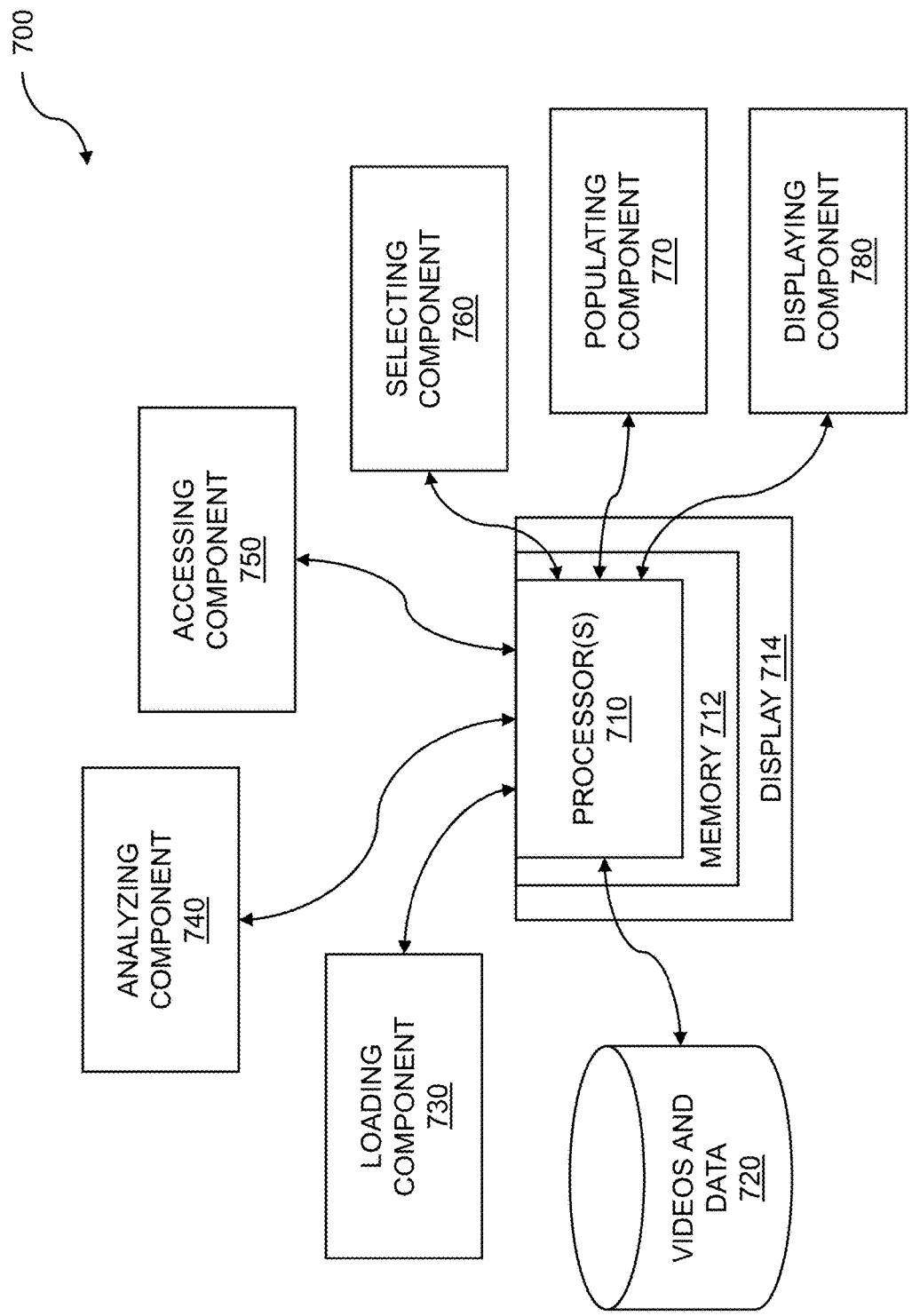
FIG. 7 is a system diagram for video manipulation.

FIG. 7 is a system diagram for video manipulation. Video manipulation is based on machine learned curating of videos for selection and display. The system 700 can include one or more processors 710 attached to a memory 712 which stores instructions. The system 700 can include a display 714 coupled to the one or more processors 710 for displaying data, videos, intermediate steps, instructions, short-form videos, and so on. In embodiments, one or more processors 710 are attached to the memory 712 where the one or more processors, when executing the instructions which are stored, are configured to: load content of a web page, wherein the content includes a frame for a plurality of short-form videos; analyze the content of the web page for textual information; access a short-form video server; select a plurality of short-form videos from the short-form video server based on the textual information, wherein the selecting includes automatically curating the plurality of short-form videos; populate the frame on the web page with the plurality of short-form videos obtained from the short-form video server; and display representations of the plurality of short-form videos within the frame on the web page.

The system 700 can include a collection of videos and data 720. The videos and data 720 may be stored in storage such as electronic storage coupled to the one or more processors, a database, one or more statically linked libraries, one or more dynamically linked libraries, or other appropriate video or data formats. The videos can include short-form videos. A short-form video can include a video that can be shown with an amount of time including a few seconds, several seconds, a minute, and so on. A short-form video can convey content quickly and efficiently to a viewer of the short-form video. The short-form video can present a story, an advertisement, a political message, and the like. A short-form video can include a video from among a plurality of videos, where the videos can comprise a wide range or variety of content. The data can include textual information or data that can be associated with a web page, as discussed below. The textual information can be augmented with image information, themes, and so on. The system 700 can include a loading component 730. The loading component 730 can include functions and instructions for loading content of a web page. The content can include a frame such as a frame within the web page. The frame can be used for a plurality of short-form videos. In embodiments, the frame can be added to an existing web page. Embodiments can include receiving a response to a call to action embedded within the frame on the web page. A call to action can include "click here", "sign up now", "buy now", etc. The call to action can include registration, a financial activity, a political action, and the like.

The system 700 can include an analyzing component 740. The analyzing component 740 can include functions and instructions for analyzing the content of the web page for textual information. The textual information can include banner text, title text, content text, hidden text, and so on. The textual information can include text associated with images, videos, GIFs, etc. The textual information can include a sponsor name or information, web page ownership or responsibility names or information, and the like. The system 700 can include an accessing component 750. The accessing component 750 can include functions and instructions for accessing a short-form video server. The short-form video server can include a local server, a cloud-based server, a mesh server, and so on. The short-form videos accessible through the video server can include advertising videos, social videos, news and information videos, political message videos, and so on. The short-form videos accessible through the short-form video server can include videos in a variety of video formats such as MPEG-4™, Flash™ QuickTime™, etc.

The system 700 can include a selecting component 760. The selecting component 760 can include functions and instructions for selecting a plurality of short-form videos from the short-form video server based on the textual information. The selecting includes automatically curating the plurality of short-form videos. The selecting can include selecting short-form videos comprising substantially similar content, substantially dissimilar content, and so on. The selecting can include adaptive learning of a user's web page behavior. Embodiments include augmenting the textual information with metadata and performing the selecting the plurality of short-form videos based on the metadata. Metadata, or "data about data", can include a time of day, a day of week, or some other period of time. The metadata can be based on inferring demographic data about a user, obtaining data from a user profile, determining web page history, and the like. Other embodiments include augmenting the textual information with image information and performing the selecting the plurality of short-form videos based on the image information. The image information can include image content information such as whether it contains an advertisement, entertainment, or a political message. The image content can include environmental information such as urban or rural; developed or undeveloped; ocean or mountains; animals such as dogs, cats, or wild creatures; daytime or nighttime; etc. Further embodiments include augmenting the textual information with themes extracted from the web page, wherein the selecting is based on ranking associations of metadata with short-form video theme information. A web page theme can include a look, a style, or a "feeling" communicated by a web page. The theme can include happy or sad, scary or motivational, entertaining or annoying, etc. The metadata from a given web page can be compared or associated with metadata from one or more other web pages.

The automatic curating of the plurality of short-form video can be accomplished by selecting short-form videos. The selecting the short-form videos can be based on a "script", predetermined policy, an advertising campaign, a political message, and the like. In embodiments, the automatic curating comprises selecting, by a neural network, a subset of the plurality of short-form videos that are appropriate for the web page. The neural network can be used to infer an appropriate selection of short-form videos, to predict an appropriate selection, and the like. The neural network can include a convolutional neural network, a recurrent neural network, etc. In embodiments, the automatic curating includes machine learning. The machine learning can include training the neural network with a training dataset, where the training dataset includes known good data and expected outcomes based on the data. The machine learning can include deep learning, and can be based on unsupervised learning, supervised learning, etc. In other embodiments, the automatic curating can provide the subset based on contextual information from the web page. The contextual information from the website can include the type of website such as a news website, an entertaining website, an e-commerce website, and the like. In embodiments, the contextual information can be based on natural language processing for audio information from the web page. The audio information can be audio information provided when a user first visits the website, audio information that results from the user navigating the website based on menu selections or button clicks, etc. In further embodiments, the contextual information can be based on video information from the web page. The video information can be provided by the website, selected by the user, and so on. In other embodiments, the automatic curating can be based on a long short-term memory model which tracks recent behavior by a user accessing the web page. A long short-term memory model can be implemented on a recurrent neural network. A long short-term memory model can process single data points such as one or more images, sequences of data such as audio or video, etc. In embodiments, the curating uses temporally weighted behaviors by a user accessing the web page. The temporally weighted behaviors can include an amount of time spend on a web page, video, audio, etc. The temporally weighted behaviors can be based on a frequency of button clicks or menu selections, an amount of time between button clicks or menu selections, and so on.

The system 700 can include a populating component 770. The populating component 770 can include functions and instructions for populating the frame on the web page with the plurality of short-form videos obtained from the short-form video server. The frame can be configured in a horizontal orientation, a vertical orientation, a matrix configuration, etc. In embodiments, the frame that is populated with the short-form videos can be added to an existing web page to facilitate display of relevant short-form videos. The system 700 can include a displaying component 780. The displaying component 780 can include functions and instructions for displaying representations of the plurality of short-form videos within the frame on the web page. The displaying representations can include resizing the short-form videos to fit within the web page width or height as configured by the user. The displaying representations can be based on a device such as a laptop computer, tablet, or smartphone being used by the user. Embodiments include auto playing the plurality of short-form videos within the frame. The auto playing the short-form videos can include looping on a portion of the short-form video, playing the entire video, etc. The displaying component 780 can include an immersive viewing experience. While conventional video viewing refers to simply staring at a mobile device displaying the short-form video, video viewing can be transformed into an interactive and participatory experience. An immersive viewing experience enables the user to rotate, move, and tilt the mobile device used to view the video while watching the video. As a result, such an immersive viewing experience is no longer exclusive to videos recorded using panoramic/spherical videos or viewed using VR (virtual reality) devices. Specifically, a good/smooth viewing experience may be defined where the video stays in bound (the user cannot see outside the video, which results in an undesirable partial black screen), the user can zoom in only when necessary (to enable the user to view as much of the video as possible), a stable view is provided (to avoid dramatic movement or scaling on rotating or tilting), a smart view is provided (when only a partial view of the video is visible, showing the significant part if possible); and video quality is ensured (in every angle/tilt of viewing).

The system 700 can include a computer program product embodied in a non-transitory computer readable medium for video manipulation, the computer program product comprising code which causes one or more processors to perform operations of: loading content of a web page, wherein the content includes a frame for a plurality of short-form videos; analyzing the content of the web page for textual information; accessing a short-form video server; selecting a plurality of short-form videos from the short-form video server based on the textual information, wherein the selecting includes automatically curating the plurality of short-form videos; populating the frame on the web page with the plurality of short-form videos obtained from the short-form video server; and displaying representations of the plurality of short-form videos within the frame on the web page.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions-generally referred to herein as a "circuit," "module," or "system" may be implemented by computer program instructions, by special-purpose hardware-based computer systems, by combinations of special purpose hardware and computer instructions, by combinations of general purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are limited to neither conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A computer-implemented method for video manipulation comprising:
   loading content of a web page, wherein the content includes a frame for a plurality of short-form videos;
   analyzing the content of the web page for textual information;
   accessing a short-form video server;
   selecting a plurality of short-form videos from the short-form video server based on the textual information, wherein the selecting includes automatically curating the plurality of short-form videos, wherein the automatic curating is based on a long short-term memory model, wherein the long short-term memory model processes one or more images, and wherein the long short-term memory model tracks recent behavior by a user accessing the web page, and wherein the automatic curating uses temporally weighted behaviors by a user accessing the web page, wherein the temporally weighted behaviors include an amount of time spent on a web page;
   populating the frame on the web page with the plurality of short-form videos obtained from the short-form video server; and
   displaying representations of the plurality of short-form videos within the frame on the web page.

2. The method of claim 1 wherein the automatic curating comprises selecting, by a neural network, a subset of the plurality of short-form videos that are appropriate for the web page.

3. The method of claim 2 wherein the automatic curating comprises machine learning.

4. The method of claim 2 wherein the automatic curating provides the subset of videos based on contextual information from the web page.

5. The method of claim 4 wherein the contextual information is based on natural language processing for audio information from the web page.

6. The method of claim 4 wherein the contextual information is based on video information from the web page.

7. The method of claim 1 wherein the frame is added to an existing web page to facilitate display of relevant short-form videos.

8. The method of claim 1 wherein the frame on the web page pulls the plurality of short-form videos from the short-form video server.

9. The method of claim 1 further comprising augmenting the textual information with metadata and performing the selecting the plurality of short-form videos based on the metadata.

10. The method of claim 9 further comprising augmenting the textual information with image information and performing the selecting the plurality of short-form videos based on the image information.

11. The method of claim 9 further comprising augmenting the textual information with themes extracted from the web page and wherein the selecting is based on ranking associations of metadata with short-form video theme information.

12. The method of claim 1 further comprising auto playing the plurality of short-form videos within the frame.

13. The method of claim 1 further comprising receiving a response to a call to action embedded within the frame on the web page.

14. The method of claim 13 further comprising providing a second plurality of short-form videos, based on the response to the call to action, from the short-form video server wherein criteria for the second plurality of short-form videos modifies the automatic curating of the plurality of short-form videos.

15. The method of claim 1 further comprising using adaptive learning for the selecting, based on a user's web page behavior.

16. The method of claim 15 wherein the adaptive learning includes collecting the user's web page behavior before the selecting.

17. The method of claim 15 wherein the adaptive learning includes collecting the user's swipes and/or clicks on the web page.

18. The method of claim 17 wherein the adaptive learning includes collecting the user's swipes and/or clicks on web pages related to the web page.

19. The method of claim 15 wherein the adaptive learning comprises comparing other users' historical patterns of web page behavior with the user's web page behavior.

20. The method of claim 15 wherein the adaptive learning combines the user's web page behavior with contextual information from the web page.

21. The method of claim 15 wherein the adaptive learning includes demographic data about the user.

22. The method of claim 15 further comprising an opting-in by the user to collect additional web page behavior, and compensating the user for the opting-in.

23. The method of claim 22 wherein the additional web page behavior includes monitoring the user's web page behavior on additional websites.

24. The method of claim 22, wherein the compensation includes access to short-form videos.

25. The method of claim 22, wherein the compensation includes crediting a blockchain coupon.

26. A computer program product embodied in a non-transitory computer readable medium for video manipulation, the computer program product comprising code which causes one or more processors to perform operations of:

loading content of a web page, wherein the content includes a frame for a plurality of short-form videos;
analyzing the content of the web page for textual information;
accessing a short-form video server;
selecting a plurality of short-form videos from the short-form video server based on the textual information, wherein the selecting includes automatically curating the plurality of short-form videos, wherein the automatic curating is based on a long short-term memory model, wherein the long short-term memory model processes one or more images, and wherein the long short-term memory model tracks recent behavior by a user accessing the web page, and wherein the automatic curating uses temporally weighted behaviors by a user accessing the web page, wherein the temporally weighted behaviors include an amount of time spent on a web page;
populating the frame on the web page with the plurality of short-form videos obtained from the short-form video server; and
displaying representations of the plurality of short-form videos within the frame on the web page.

27. A computer system for video manipulation comprising:
a memory which stores instructions;
one or more processors attached to the memory, wherein the one or more processors, when executing the instructions which are stored, are configured to:
load content of a web page, wherein the content includes a frame for a plurality of short-form videos;
analyze the content of the web page for textual information;
access a short-form video server;
select a plurality of short-form videos from the short-form video server based on the textual information, wherein the selecting includes automatically curating the plurality of short-form videos, wherein the automatic curating is based on a long short-term memory model, wherein the long short-term memory model processes one or more images, and wherein the long short-term memory model tracks recent behavior by a user accessing the web page, and wherein the automatic curating uses temporally weighted behaviors by a user accessing the web page, wherein the temporally weighted behaviors include an amount of time spent on a web page;
populate the frame on the web page with the plurality of short-form videos obtained from the short-form video server; and
display representations of the plurality of short-form videos within the frame on the web page.

* * * * *